US012687052B2

(12) United States Patent
Nakashima et al.

(10) Patent No.: US 12,687,052 B2
(45) Date of Patent: Jul. 21, 2026

(54) VEHICLE DOOR CONTROL SYSTEM

(71) Applicant: HONDA MOTOR CO., LTD., Tokyo (JP)

(72) Inventors: Atsushi Nakashima, Tokyo (JP); Mitsunori Nishino, Tokyo (JP); Toshihiro Kaneda, Tokyo (JP); Akira Kamikura, Tokyo (JP); Riki Toyooka, Tokyo (JP); Makoto Ono, Tokyo (JP); Tsukasa Kishida, Tokyo (JP); Koji Masuda, Tokyo (JP); Yoichi Katayama, Tokyo (JP); Koji Nomura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 376 days.

(21) Appl. No.: 18/438,689

(22) Filed: Feb. 12, 2024

(65) Prior Publication Data

US 2024/0287837 A1 Aug. 29, 2024

(30) Foreign Application Priority Data

Feb. 24, 2023 (JP) ................................. 2023-027663

(51) Int. Cl.
*E05B 83/40* (2014.01)
*E05F 15/73* (2015.01)

(52) U.S. Cl.
CPC .............. *E05B 83/40* (2013.01); *E05F 15/73* (2015.01); *E05Y 2900/531* (2013.01)

(58) Field of Classification Search
CPC .......... E05B 83/40; E05B 83/36; E05F 15/73; E06Y 2900/531
USPC ....................................................... 296/146.1
See application file for complete search history.

(56) References Cited

U.S. PATENT DOCUMENTS

| | | | | |
|---|---|---|---|---|
| 10,145,165 | B2 * | 12/2018 | Elie | E05D 5/062 |
| 12,345,085 | B2 * | 7/2025 | Kromer | E05F 15/627 |
| 2013/0031747 | A1 * | 2/2013 | Gobart | E05D 11/1028 16/82 |
| 2020/0165848 | A1 | 5/2020 | Shimizu | |

FOREIGN PATENT DOCUMENTS

| | | |
|---|---|---|
| JP | 2020-083148 A | 6/2020 |

* cited by examiner

*Primary Examiner* — Steven O Douglas
(74) *Attorney, Agent, or Firm* — Rankin, Hill & Clark LLP

(57) ABSTRACT

A vehicle door control system includes a door, holding part, and controller. The door is capable of opening and closing by a motion of swinging relative to a vehicle body. The holding part is capable of switching between an openable-and-closable state and a holding state. The openable-and-closable state is a state in which movement of the door in an opening direction that opens the door and movement of the door in a closing direction that closes the door are allowed. The holding state is a state in which movement of the door in the opening direction is prohibited and movement of the door in the closing direction is allowed. The controller is configured to control the holding part. The controller is configured to set the holding part to the holding state in response to the door stopping its movement while the door is open.

7 Claims, 7 Drawing Sheets

VEHICLE DOOR CONTROL SYSTEM

CROSS-REFERENCE STATEMENT

The present application is based on, and claims priority from, Japanese Patent Application Number 2023-027663 filed Feb. 24, 2023, the disclosure of which is hereby incorporated by reference herein in its entirety.

BACKGROUND

Technical Field

The disclosure relates to a door of a vehicle.

Related Art

Efforts have increased in recent years to provide access to sustainable transportation systems that consider vulnerable groups, such as the elderly, persons with disabilities, and children, among their transport participants. To realize this objective, the Applicant has been focusing on research and development to further improve safety and convenience of transport through the development of vehicle accessibility.

Patent Literature 1 (Japanese Unexamined Patent Application Publication Number 2020-83148) discloses a system that activates an electromagnetic brake device for a vehicle door when a peripheral detection sensor detects an obstacle in the periphery. Said system activates a forced brake device for the vehicle door when the braking force of the electromagnetic brake device reaches its maximum.

The technique disclosed in Patent Literature 1 stops the movement of the door when an obstacle is detected by applying braking force to the door in both the opening direction and closing direction of the door. The disclosure of Patent Literature 1 does not contribute to easing an effort by an occupant to get in and get out of a vehicle.

SUMMARY

One or more aspects of the disclosure are directed to a vehicle door control system that includes a door, holding part, and controller. The door is capable of opening and closing by a motion of swinging relative to a vehicle body. The holding part is capable of switching between an openable-and-closable state and a holding state. The openable-and-closable state is a state in which movement of the door in an opening direction that opens the door and movement of the door in a closing direction that closes the door are allowed. The holding state is a state in which movement of the door in the opening direction is prohibited and movement of the door in the closing direction is allowed. The controller is configured to control the holding part. The controller is configured to set the holding part to the holding state in response to the door stopping its movement while the door is open.

DRAWINGS

DETAILED DESCRIPTION

Figure 1:
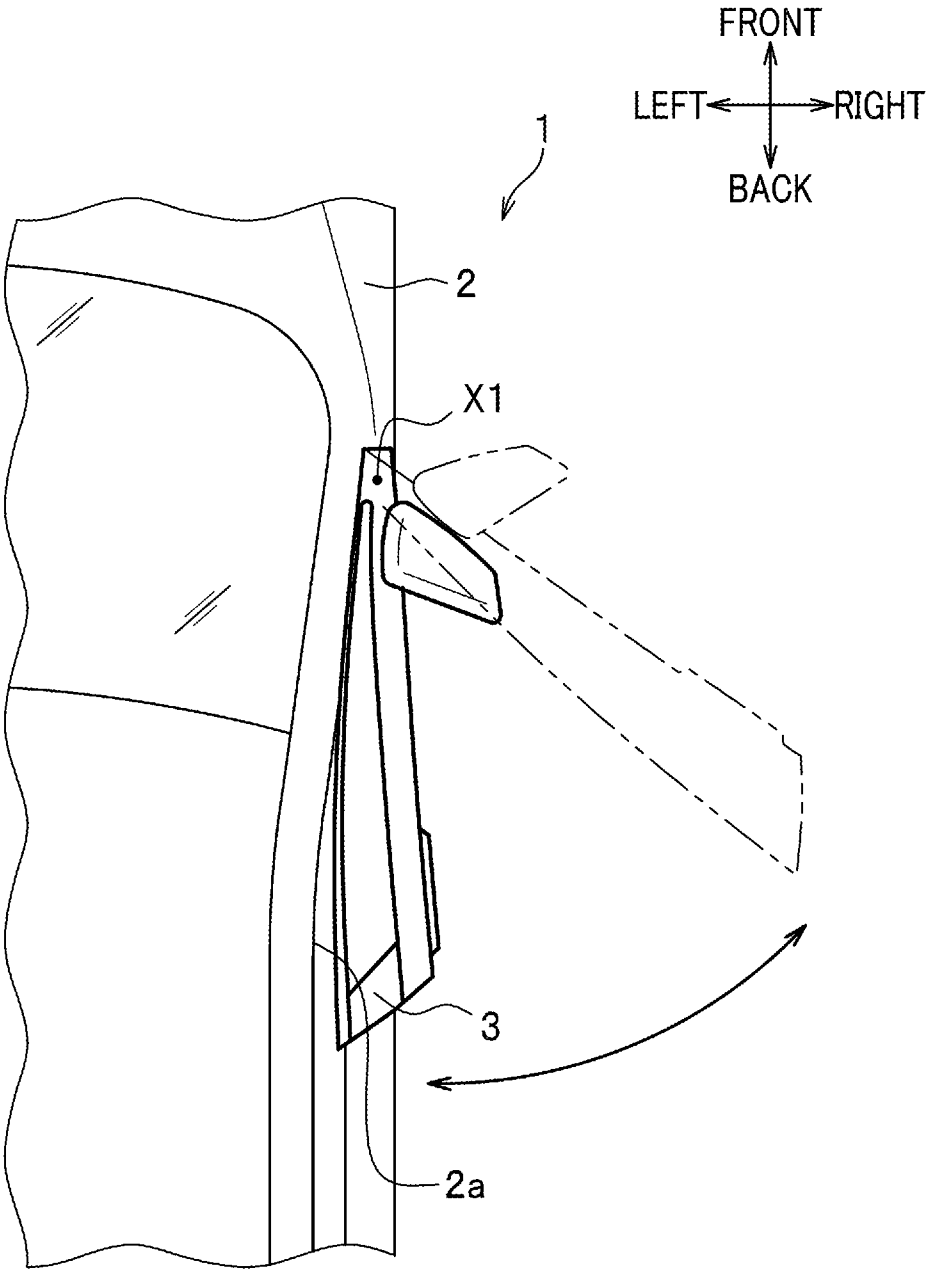
FIG. 1 is a plan view of a schematically shown vehicle to which a vehicle door control system according to a first embodiment of the disclosure is applied.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An embodiment of the disclosure will be described in detail with reference to the drawings, taking as an example a case where a vehicle door control system of the disclosure is applied to a side door for a front seat on the right side of a vehicle (for example, a driver seat of a vehicle in Japan). In the referenced drawings, "front" and "back" indicate a forward direction and backward direction respectively in terms of a direction of travel of the vehicle. That is, the "front" and "back" indicate a front direction and back direction respectively of a vehicle body. Further, in the referenced drawings, "left" and "right" indicate a left direction and right direction (vehicle width directions) respectively as viewed from a driver seat. Alternatively, in one or more embodiments, the "left" and "right" may indicate a left and right direction (vehicle width directions) as viewed from a passenger seat that is facing the front.

As shown in FIG. 1, a vehicle to which a vehicle door control system 1 according to an embodiment of the disclosure is applied includes a vehicle body 2 and a door (side door) 3 that the vehicle body 2 is provided with.

Door

The door 3 is provided to be able to open and close an opening 2*a* (see FIG. 3) of a side surface (in the present embodiment, a right side surface) of the vehicle body 2 in a vehicle width direction. The door 3 is swingably attached to the vehicle body 2 with a rotatable shaft X1 that extends vertically (in an upward or a downward direction) at a front end portion of the door 3. As shown in FIG. 1, the door 3 is swingable in a plan view.

Figure 2:
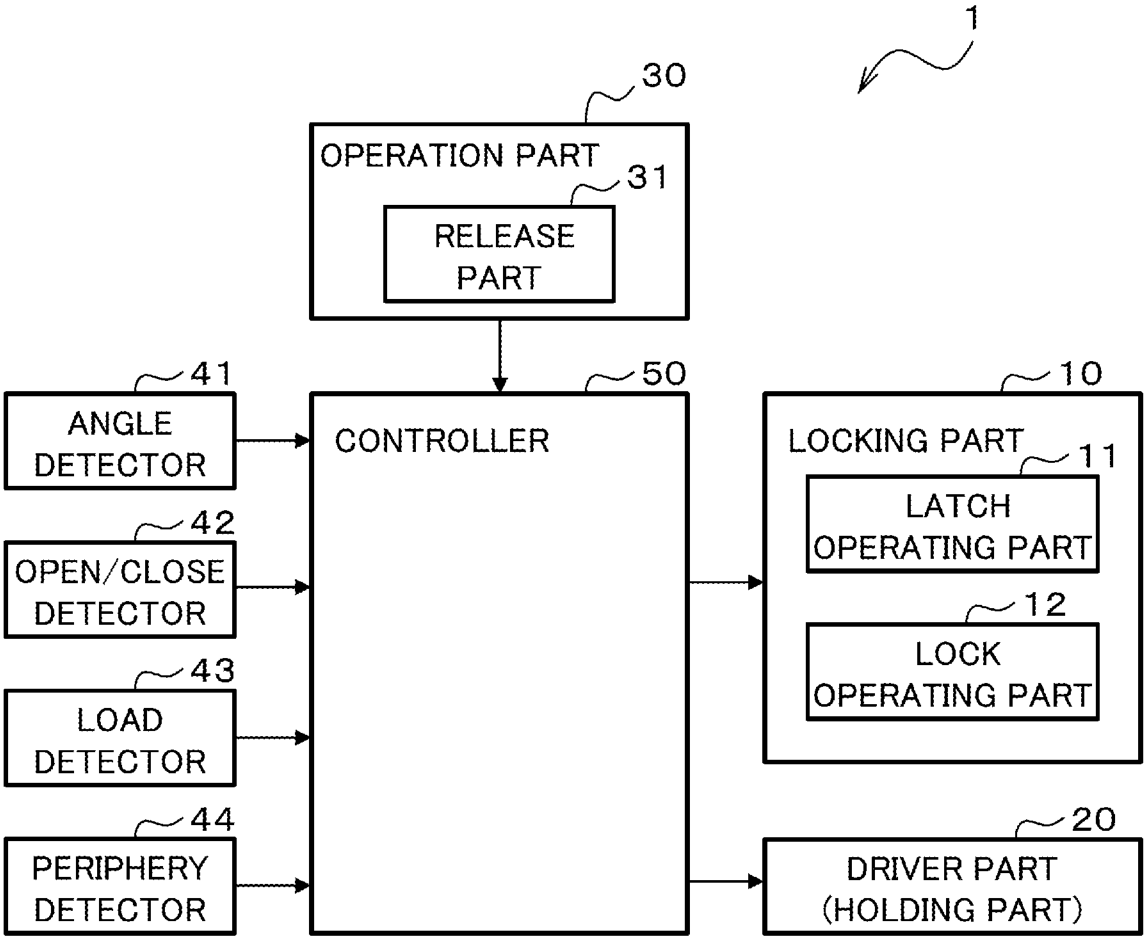
FIG. 2 is a block diagram schematically showing a vehicle door control system according to an embodiment of the disclosure.

As shown in FIG. 2, the vehicle door control system 1 includes a locking part 10 (a lock), a driver part 20 (a driver), an operation part 30, an angle detector 41, an open/close detector 42, a load detector 43, a periphery detector 44, and a controller 50.

Locking Part

The locking part 10 (lock) operates a latch mechanism and lock mechanism based on an operation of a door handle or a key cylinder by a user (an occupant), a control signal from the controller 50, or the like. The latch mechanism is capable of maintaining the door 3 in a closed state. The lock mechanism is capable of switching the latch mechanism between an unlocked state and a locked state. The locking part 10 includes a latch operating part 11 and a lock operating part 12.

Latch Operating Part

Based on an operation of a door handle by the user, a control signal from the controller 50, or the like, the latch operating part 11 enables the door 3 to be opened by operating the latch mechanism of the door 3 that is in a closed state.

Lock Operating Part

Based on an operation of the key cylinder by the user, a control signal from the controller 50, or the like, the lock operating part 12 sets the door 3 to be in an unlocked state in which the door 3 can be opened or to be in a locked state in which the door 3 cannot be opened by operating the lock mechanism of the door 3 in a closed state.

Driver Part

The driver part 20 (driver) drives the door 3 to open and close (a swing operation) based on a control signal from the controller 50 or the like.

Figure 3:
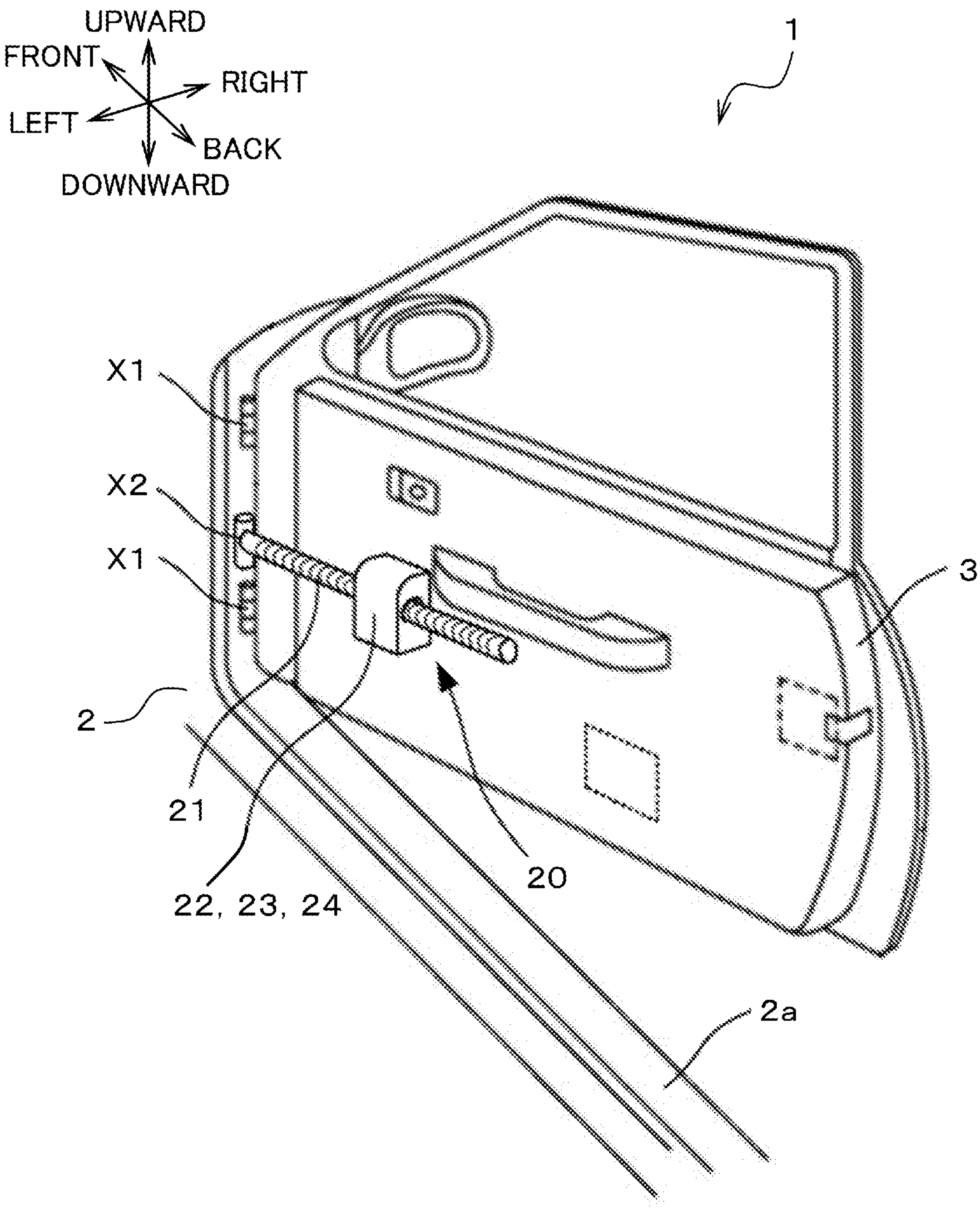
FIG. 3 is a perspective view schematically showing a door to which a vehicle door control system according to an embodiment of the disclosure is applied.

As shown in FIG. 3, the driver part 20 (driver) includes a spindle screw 21, a spindle nut 22, a motor 23, and a brake part 24. The spindle screw 21 is swingably supported by the vehicle body 2. The spindle nut 22 is provided on the door 3 side and can be threadedly engaged with the spindle screw 21. The motor 23 is provided on the door 3 side and is connected to the spindle nut 22 via a speed reduction mechanism.

A base end portion of the spindle screw 21 is pivotally supported by a rotatable shaft X2 that extends vertically (in an upward or a downward direction) along a front edge portion of the opening 2*a* of the vehicle body 2. The rotatable shaft X2 is provided more inward in the vehicle width direction compared to the rotatable shaft X1 of the door 3.

The driver part 20 (driver) changes a screwed on position of the spindle nut 22 to the spindle screw 21 by a rotation drive of the motor 23. This makes it possible to change an opening/closing angle of the door 3 with respect to the vehicle body 2.

The brake part 24 is an electromagnetic brake incorporated in the motor 23 or the speed reduction mechanism. The brake part 24 switches between a state in which a relative movement of the spindle nut 22 with respect to the spindle screw 21 in a direction that opens the door 3 is allowed (an openable-and-closable state) and a state in which the relative movement is prohibited (a holding state) based on a control signal from the controller 50. The brake part 24 is not limited to an electromagnetic brake but may be a physical brake (such as a clutch).

Braking force of the brake part 24 is set to be able to support a load of the user when the user leans against the door 3. The driver part 20 may be configured to open the door 3 when a load sufficiently larger than the braking force acts on the door 3 while the door 3 is in the holding state.

Operation Part

The operation part 30 is configured to include an intelligent key, a switch provided in the vehicle, or the like and outputs a result of an operation by the user to the controller 50 as shown in FIG. 2. The operation part 30 includes a release part 31 for releasing the holding state, which will be described later.

Angle Detector

The angle detector 41 is a sensor that detects an opening/closing angle of the door 3 with respect to the vehicle body 2 (including a parameter correlated with the opening/closing angle) and outputs a result of detection to the controller 50. The angle detector 41 may be a sensor that is provided in the driver part 20 and, for example, counts a pulse of the motor 23 of the driver part 20 as a parameter correlated with the opening/closing angle and outputs a count result to the controller 50. The controller 50 may calculate the opening/closing angle of the door 3 based on the count result.

Open/Close Detector

The open/close detector 42 is a sensor that detects whether the door 3 is in a closed state (a fully closed state) or an open state and outputs a result of detection to the controller 50. In the present embodiment, the open/close detector 42 detects a state of the latch mechanism (not shown) that is capable of fixing the door 3 to the vehicle body 2 as the open or closed state of the door 3.

Load Detector

The load detector 43 is a sensor that detects an external load acting on the door 3 and outputs a result of detection to the controller 50. In the present embodiment, the load detector 43 detects a load that is acting in a direction (an opening direction or a closing direction) that is orthogonal to a surface of the door 3.

Periphery Detector

The periphery detector 44 is a sensor that detects an object that is present around the door 3 and outputs a result of detection to the controller 50. The periphery detector 44 may be realized by a camera, an infrared camera, an ultrasonic sensor, or the like.

Controller

The controller 50 is what is called an electronic control unit (ECU) that is configured to include a CPU (central processing unit), a ROM (read-only memory), a RAM (random access memory), and an input/output circuit, or the like. When an operation result of the operation part 30 indicates an automatic opening/closing, the controller 50 automatically opens/closes the door 3 by controlling the driver part 20. When an operation result of the operation part 30 indicates a manual opening/closing, the controller 50 controls the driver part 20 based on the detection result of the load detector 43, thereby generating assisting force that assists the user in manually opening/closing the door 3 (assist mode).

The controller 50 controls the driver part (holding part) 20 to switch the driver part 20 between the openable-and-closable state and the holding state. The openable-and-closable state is a state in which the door 3 is capable of moving (allowed to move) automatically or manually in both an opening direction and a closing direction thereof. The holding state is a state in which the door 3 is capable of moving (allowed to move) automatically or manually in the closing direction but is incapable of moving (prohibited from moving) automatically or manually in the opening direction. When a user who intends to get in or get out of the vehicle puts his/her/their hand on an interior side of the door 3, the door 3 whose driver part 20 is in the holding state can support the weight of the user without moving in the opening direction. Therefore, the getting in and getting out of the vehicle by an occupant can be suitably supported.

When the door 3 stops moving while it is in an open state, the controller 50 sets the driver part (holding part) 20 to the holding state. The controller 50 may recognize that the door 3 is in an open state based on the detection result of the angle detector 41. The controller 50 may recognize that the door 3 has stopped moving based on the detection result of the angle detector 41 or a control state of the driver part 20.

In the present embodiment, the controller 50 sets the driver part (holding part) 20 to the holding state when the door 3 stops moving during movement in the opening direction and sets the driver part (holding part) 20 to the openable-and-closable state when the door 3 stops moving during movement in the closing direction. The controller 50 may recognize the direction of movement of the door 3 based on the detection result of the angle detector 41 or the control state of the driver part 20.

The controller 50 allows the driver part (holding part) 20 to be in the holding state when the detection result of the angle detector 41 is equal to or greater than a first predetermined angle (e.g., 15 degrees) and prohibits the driver part (holding part) 20 from being in the holding state when the detection result of the angle detector 41 is less than the first predetermined angle (e.g., 15 degrees). That is, when the opening/closing angle of the door 3 is equal to or greater than the first predetermined angle, the driver part (holding part) 20 may switch between the openable-and-closable state and the holding state and, when the opening/closing angle of the door 3 is less than the first predetermined angle, the driver part (holding part) 20 may take only the openable-and-closable state. Therefore, when the opening/closing angle of the door 3 is less than the first predetermined angle, the driver part (holding part) 20 that is in the holding state is switched to be in the openable-and-closable state.

Operation Example

Next, operation examples of the vehicle door control system 1 according to an embodiment of the disclosure, that is, operation examples of switching the driver part (holding part) 20 between the openable-and-closable state and the holding state, will be described with reference to flowcharts of FIGS. 4, 5, and 6 (with reference to FIGS. 1-3 as appropriate). Operation examples for the opening direction will be described followed by an operation example for the closing direction. When an operation result of the operation part 30 indicates an opening operation of the door 3 and/or when the user is manually performing an opening operation of the door 3 (which may be determined based on the detection results of the angle detector 41 and the load detector 43), the controller 50 controls the locking part 10 and the driver part 20 in accordance with the flowchart of FIG. 4 or FIG. 5. When an operation result of the operation part 30 indicates a closing operation of the door 3 and/or when the user is manually performing a closing operation of the door 3 (which may be determined based on the detection results of the angle detector 41 and the load detector 43), the controller 50 operates according to the flowchart of FIG. 6.

Operation Example for Opening Direction: First Opening Operation Example

First, an operation example (first opening operation example) of the vehicle door control system 1 for an opening operation of the door 3 will be described with reference to a flowchart of FIG. 4. As an initial state, the door 3 has been slightly opened from a closed state by an operation of the locking part 10 under control of the controller 50 and the driver part (holding part) 20 is set to the openable-and-closable state.

When an operation result of the operation part 30 indicates an automatic opening operation of the door 3 (step S1: AUTOMATIC), the controller 50 controls the driver part 20 to move the door 3 in the opening direction (step S2A). On the other hand, when the operation result of the operation part 30 indicates a manual opening operation of the door 3 (step S1: MANUAL), the controller 50 controls the driver part 20 to assist a movement of the door 3 in the opening direction (step S2B).

After step S2A is executed (thus, while the driver part 20 drives the door 3 to open), when there is an operation (an operation requesting the door 3 to stop) on the operation part 30 (step S3: YES), the controller 50 stops the door 3 by controlling the driver part 20 (step S7).

After step S2A is executed (thus, while the driver part 20 drives the door 3 to open), when the load detector 43 detects a load that is equal to or greater than a first predetermined value (step S4: YES), the controller 50 stops the door 3 by controlling the driver part 20 (step S7). For example, the controller 50 stops the door 3 when the door 3 hits a person or when the door 3 is pushed in the opening direction or closing direction by wind, a user, or the like.

After step S2A is executed (thus, while the driver part 20 drives the door 3 to open), when the periphery detector 44 detects an object along a trajectory of the door 3 (step S5: YES), the controller 50 stops the door 3 by controlling the driver part 20 (step S7). For example, the controller 50 stops the door 3 when an object (a person, an obstacle, or the like) is located (including dynamic detection) along a trajectory of the door 3 in the opening direction or when a moving object (a vehicle, a bicycle, or the like) is approaching the trajectory of the door 3 in the opening direction.

After step S2A is executed (thus, while the driver part 20 drives the door 3 to open), when the door 3 is not stopped halfway (steps S3, S4, and S5: NO) and when the detection result of the angle detector 41 is less than a second predetermined angle (step S6: NO), a process of the present flowchart returns to step S1. The second predetermined angle is larger than the first predetermined angle and smaller than a maximum angle (e.g., an arbitrary angle approximately between 65 degrees and 75 degrees) at which the door 3 is structurally able to open. For example, the second predetermined angle is 45 degrees.

After step S2A is executed (thus, while the driver part 20 drives the door 3 to open), when the door 3 is not stopped halfway (steps S3, S4, and S5: NO) and when the detection result of the angle detector 41 is equal to or greater than the second predetermined angle (step S6: YES), the controller 50 stops the door 3 by controlling the driver part 20 (step S7).

After step S2B is executed on the other hand, when a user stops the manual opening operation of the door 3, the controller 50 stops assisting the movement the door 3 in the opening direction by controlling the driver part 20 (step S7).

After step S7 is executed, when the detection result of the angle detector 41 is equal to or greater than the first predetermined angle (step S8: YES), the controller 50 sets the driver part 20 to the holding state and prohibits movement of the door 3 in the opening direction by controlling the driver part (holding part) 20 (step S9).

A user who is getting in the vehicle can, by putting his/her/their hand on the interior side of the door 3 whose driver part 20 is in the holding state, get in with his/her/their weight being supported by the door 3. Similarly, a user who is getting out of the vehicle can, by putting his/her/their hand on the interior side of the door 3 whose driver part 20 is in the holding state, get out with his/her/their weight being supported by the door 3. Further, when a user who is getting in or out of the vehicle unintentionally touches the door 3, the vehicle door control system 1 can prevent the door 3 from opening.

On the other hand, after step S7 is executed, when the detection result of the angle detector 41 is less than the first predetermined angle (step S8: NO), the process of the present flowchart returns to step S1.

After step S9 is executed, when the release part 31 is operated by the user (step S10: YES), the controller 50 sets the driver part 20 to the openable-and-closable state by controlling the driver part (holding part) 20 (step S11) and then the process of the present flowchart returns to step S1. This enables the door 3 to be opened further either automatically or manually.

When a response to step S6 is YES and a response to step S10 is YES, the controller 50 resets the second predetermined angle (that is, for example, 45 degrees prior to being reset) to be larger by a predetermined additional angle (for example, 5 degrees). This enables the door 3 to be opened further either automatically or manually even when the door 3 is already open to the second predetermined angle (prior to resetting).

Operation Example for Opening Direction: Second Opening Operation Example

Next, with reference to a flowchart of FIG. 5, an operation example (second opening operation example) of the vehicle door control system 1 for an opening operation of the door 3 will be described with a focus on a difference from the first opening operation example.

Figure 5:
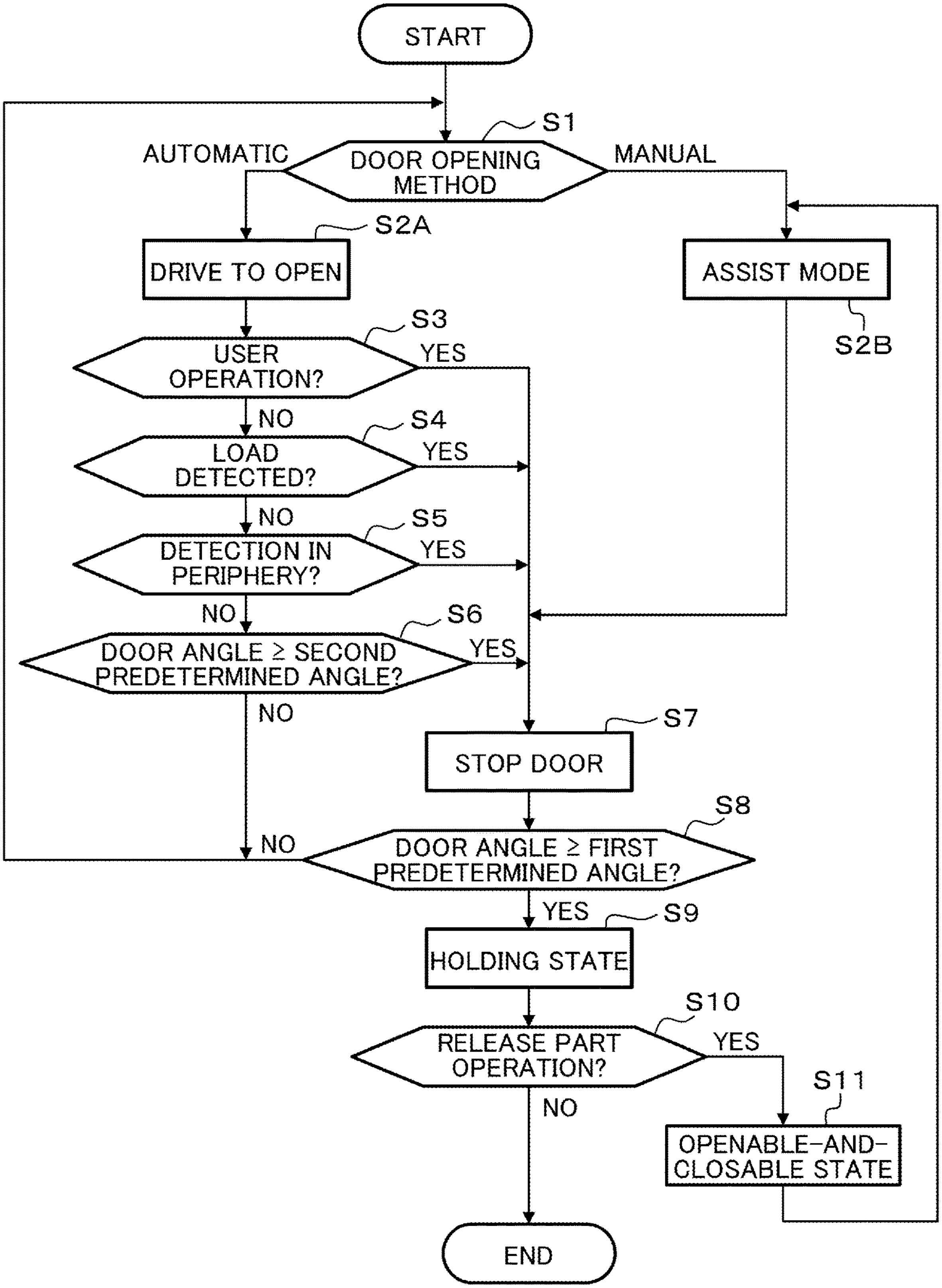
FIG. 5 is a flowchart for explaining an operation example of a vehicle door control system according to an embodiment of the disclosure for an operation in an opening direction (second opening operation example).

As shown in FIG. 5, after step S11 is executed, a process of the present flowchart proceeds to step S2B. That is, when the controller 50 releases the holding state of the driver part (holding part) 20 after the door 3 has stopped and sets the driver part (holding part) 20 to the openable-and-closable state, the controller 50 prohibits an automatic opening operation (and closing operation) of the door 3 by the driver part (holding part) 20 and, by controlling the driver part (holding part) 20, assists a movement of the door 3 in the opening direction (and closing direction).

Operation Example for Closing Direction

Next, an operation example of the vehicle door control system 1 for a closing operation of the door 3 will be described with reference to a flowchart of FIG. 6. As an initial state, the door 3 is open and the driver part (holding part) 20 is set to the holding state (a situation after the execution of step S9 is assumed).

Figure 6:
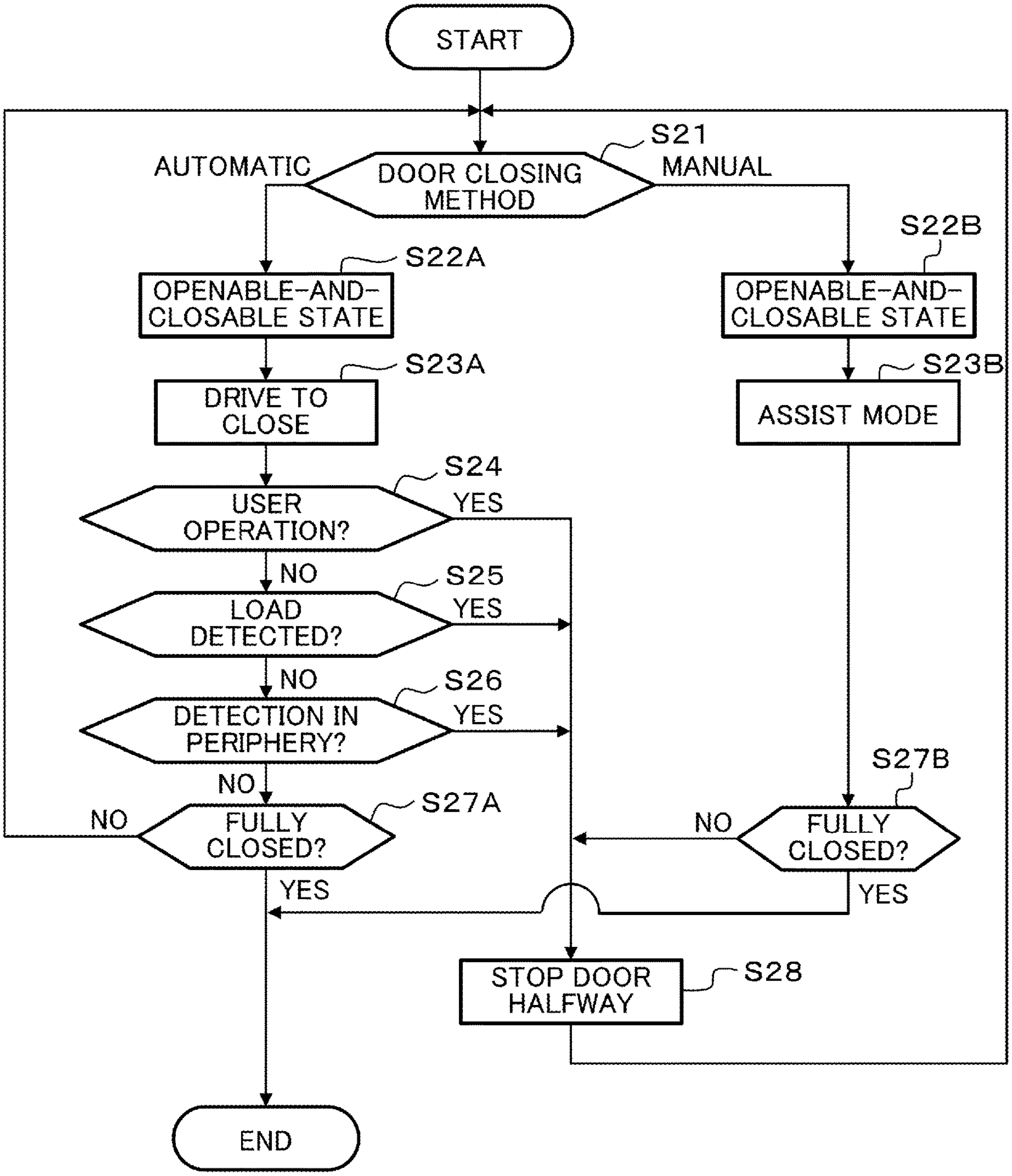
FIG. 6 is a flowchart for explaining an operation example of a vehicle door control system according to an embodiment of the disclosure for an operation in a closing direction.

As shown in FIG. 6, when an operation result of the operation part 30 indicates an automatic closing operation of the door 3 (step S21: AUTOMATIC), the controller 50 controls the driver part 20 to set the driver part (holding part) 20 to the openable-and-closable state (step S22A) and move the door 3 in the closing direction (step S23A). On the other hand, when the operation result of the operation part 30 indicates a manual closing operation of the door 3 (step S21: MANUAL), the controller 50 controls the driver part (holding part) 20 to set the driver part (holding part) 20 to the openable-and-closable state (step S22B) and assist a movement of the door 3 in the closing direction (step S23B).

When a user is getting in the vehicle, the user closes the door 3 by putting his/her/their hand on the interior side of the door 3 while the user is seated in a seat during an execution of step S23B. Similarly, when a user is getting out of the vehicle, the user closes the door 3 by putting his/her/their hand on an exterior side of the door 3 during the execution of step S23B.

After step S23A is executed (thus, while the driver part 20 drives the door 3 to close), when there is an operation (an operation to request the door 3 to stop) on the operation part 30 (step S24: YES), the controller 50 stops the door 3 by controlling the driver part 20 (step S28) and a process of the present flowchart returns to step S21.

After step S23A is executed (thus, while the driver part 20 drives the door 3 to close), when the load detector 43 detects a load that is equal to or greater than the first predetermined value (step S25: YES), the controller 50 stops the door 3 by controlling the driver part 20 (step S28) and the process of the present flowchart returns to step S21. For example, the controller 50 stops the door 3 when the door 3 hits a person or when the door 3 is pushed in the opening direction or closing direction by wind, a user, or the like.

After step S23A is executed (thus, while the driver part 20 drives the door 3 to close), when the periphery detector 44 detects an object along a trajectory of the door 3 (step S26: YES), the controller 50 stops the door 3 by controlling the driver part 20 (step S28) and the process of the present flowchart returns to step S21. For example, the controller 50 stops the door 3 when an object (a person, an obstacle, or the like) is located (including dynamic detection) along a trajectory of the door 3 in the closing direction or when a moving object (a vehicle, a bicycle, or the like) is approaching the trajectory of the door 3 in the closing direction.

That is, when the door 3 stops halfway in the closing operation, the controller 50 does not set the driver part (holding part) 20 to the holding state but allows the door 3 to move in the opening direction. More specifically, when the door 3 that is moving to close in the openable-and-closable state stops halfway, the controller 50 maintains the openable-and-closable state of the driver part (holding part) 20. Further, when the door 3 that is moving to close in the holding state stops halfway, the controller 50 switches the state of the driver part (holding part) 20 to the openable-and-closable state (for example, prohibits the holding state).

After step S23A is executed (thus, while the driver part 20 drives the door 3 to close), when the door 3 is not stopped halfway (steps S24, S25, and S26: NO) and when the detection result of the angle detector 41 does not indicate a fully closed state (including a substantially fully closed state) of the door 3 (step S27A: NO), the process of the present flowchart returns to step S21. On the other hand, when the detection result of the angle detector 41 indicates a fully closed state (including a substantially fully closed state) of the door 3 (step S27A: YES), the process of the present flowchart ends. For example, when the detection result of the angle detector 41 indicates that the door 3 is in a substantially fully closed state, the controller 50 stops the driver part 20 and then controls the latch operating part 11 to change a state of the latch mechanism from a half-latched state (a state in which the door 3 is not properly closed) to a fully-latched state, thereby bringing the door 3 to the fully closed state. The door 3 that is in a "substantially fully closed state" means that an angle of the door 3 with respect to the body part 2 is an angle at which the door 3 can be switched from a state in which the door 3 is not properly closed to the fully closed state by an operation of the latch operating part 11.

Similarly, after step S23B is executed, when a user stops the manual closing operation of the door 3 and the door 3 stops halfway in the closing operation (step S28 following a NO of step S27B), the process of the present flowchart returns to step S21. On the other hand, after step S23B is executed, when the detection result of the angle detector 41 indicates a fully closed state (including the substantially fully closed state) of the door 3 (step S27B: YES), the process of the present flowchart ends. For example, when the detection result of the angle detector 41 indicates that the door 3 is substantially fully closed, the controller 50 stops the driver part 20 and then controls the latch operating part 11 to change the state of the latch mechanism from the half-latched state to the fully-latched state, thereby bringing the door 3 to the fully closed state.

Operation Example to Release Holding State

Figure 4:
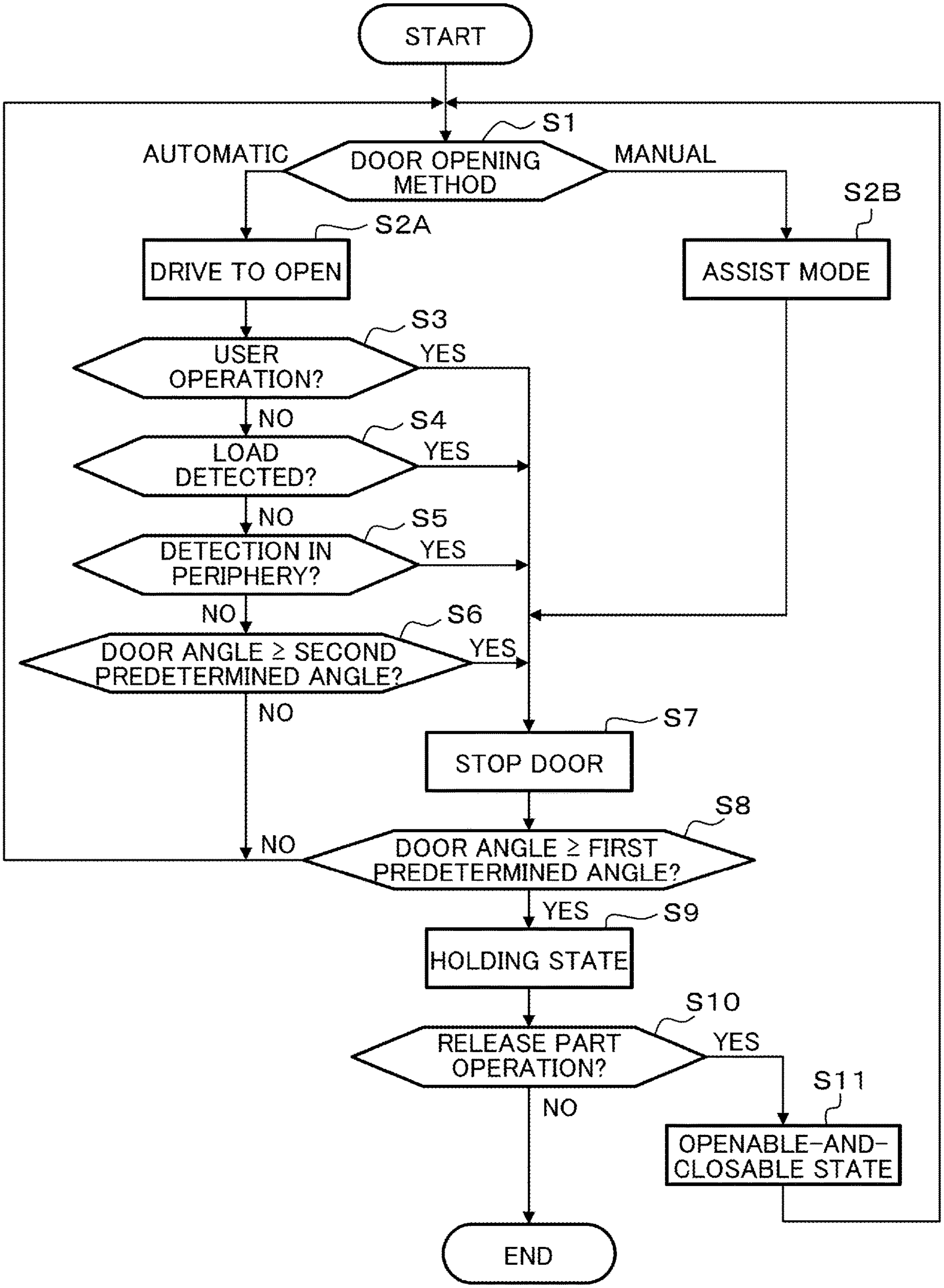
FIG. 4 is a flowchart for explaining an operation example of a vehicle door control system according to an embodiment of the disclosure for an operation in an opening direction (first opening operation example).
Figure 7:
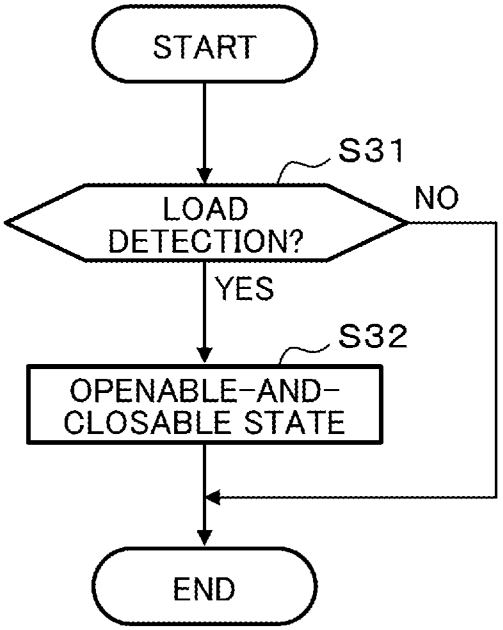
FIG. 7 is a flowchart for explaining an operation example of a vehicle door control system according to an embodiment of the disclosure.

As shown in FIG. 7, when the load detector 43 detects a load that is in the opening direction and is equal to or greater than a second predetermined value (that is larger than the first predetermined value) during execution of a flowchart process of FIG. 4, 5, or 6 (step S31: YES), the controller 50 may be configured to set the driver part (holding part) 20 to the openable-and-closable state (step S32). This allows the door 3 to move in the opening direction due to the load in order to protect the driver part (holding part) 20. The controller 50 may be configured to gradually switch the driver part 20 from the holding state to the openable-and-closable state.

Aspects and Effects

An object of the disclosure is to provide a vehicle door control system that improves an ease by which an occupant (a passenger, driver, or the like) gets in and gets out of a vehicle and thereby contribute to the development of a sustainable transportation system.

According to the disclosure, because getting in and getting out of a vehicle using its door in the holding state as support and a closing operation of the door are compatible, vehicle access for an occupant is improved, and this can contribute to the development of a sustainable transportation system.

One or more aspects of the disclosure are directed to a vehicle door control system 1 that includes a door 3, a holding part (a driver part 20), and a controller 50. The door 3 is capable of opening and closing by a motion of swinging relative to a vehicle body 2. The holding part (driver part 20) is capable of switching between an openable-and-closable state and a holding state. The openable-and-closable state is a state in which movement of the door 3 in an opening direction that opens the door 3 and movement of the door 3 in a closing direction that closes the door 3 are allowed. The holding state is a state in which movement of the door 3 in the opening direction is prohibited and movement of the door in the closing direction is allowed. The controller 50 is configured to control the holding part. The controller 50 is configured to set the holding part to the holding state in response to the door stopping its movement while the door is open.

By allowing the getting in and out of a vehicle using the door 3 in the holding state as support and allowing a closing operation of the door 3, the vehicle door control system 1 can ease the getting in and out of the vehicle by an occupant, and thereby contribute to the development of a sustainable transportation system.

Another aspect of the disclosure is directed to a vehicle door control system 1 in which, in response to the door 3 stopping while moving in the opening direction, the controller 50 is configured to set the holding part to the holding state and, in response to the door 3 stopping while moving in the closing direction, the controller 50 is configured to not set the holding part to the holding state.

By allowing the getting in and out of the vehicle using the door 3 in the holding state as support and allowing a closing operation of the door 3, the vehicle door control system 1 can ease the getting in and out of the vehicle by an occupant after an opening operation of the door 3. Further, by allowing an opening operation of the door 3 after a closing operation of the door 3, the vehicle door control system 1 improves operability of the door 3.

Another aspect of the disclosure is directed to a vehicle door control system 1 that further includes a release part 31 that is operable by a user. In response to the release part 31 being operated, the controller 50 is configured to set the holding part that is in the holding state to the openable-and-closable state.

Therefore, when the opening/closing angle of the door 3 is insufficient for an occupant to get in or get out of the vehicle, the vehicle door control system 1 may open the door 3 further.

Another aspect of the disclosure is directed to a vehicle door control system 1 in which, in response to the door 3 stopping during movement in the opening direction while the holding part is in the openable-and-closable state by the operation of the release part 31, the controller 50 is configured to set the holding part to the holding state.

Therefore, by setting the holding part of the door 3 to the holding state again after the door 3 has been opened further, the vehicle door control system 1 can support the getting in and out of the vehicle by the occupant without increasing the number of operations to be made by the occupant.

Another aspect of the disclosure is directed to a vehicle door control system 1 in which, in response to an opening/closing angle of the door 3 being equal to or less than a predetermined angle (a first predetermined angle), the controller 50 is configured to prohibit the holding state.

Therefore, when the opening/closing angle of the door 3 is too small to be suitable to get in or get out of the vehicle, the vehicle door control system 1 can avoid the unnecessary holding state and allow the opening and closing of the door 3.

Another aspect of the disclosure is directed to a vehicle door control system 1 that further includes a driver part 20 that is configured to drive the door 3 to open or close. The controller 50 is configured to control the driver part 20 as the holding part.

By unifying the driver part 20 and the holding part, the vehicle door control system 1 can simplify its configuration.

Another aspect of the disclosure is directed to a vehicle door control system 1 in which, in response to the door 3 receiving a load that is equal to or greater than a predetermined value (a second predetermined value) in the opening direction while the driver part 20 of the door 3 is in the holding state, the controller 50 is configured to release the holding state of the driver part 20.

Therefore, the vehicle door control system 1 can prevent the driver part 20 from being damaged by a large load.

Although embodiments of the disclosure have been described above, the disclosure is not limited to the above-described embodiments. Embodiments can be modified within a range that does not depart from the scope of the disclosure. For example, the driver part 20 as the holding part may perform the automatic opening and closing of the door 3 or the assisting of a manual opening and closing or both the automatic opening and closing of the door 3 and the assisting of a manual opening and closing. The holding part may be provided separately from the driver part 20, and in this case, the vehicle door control system 1 may be configured not to include the driver part 20. In steps S1 and S21, when an operation result of the operation part 30 indicating an automatic opening or closing operation of the door 3 is not inputted, the controller 50 may be configured to determine that the opening or closing operation is manual. The controller 50 may be configured not to provide assistance by the driver part 20 (100% human power) during the manual opening operation and/or manual closing operation of the door 3.

What is claimed is:

1. A vehicle door control system comprising:

a door capable of opening and closing by a motion of swinging relative to a vehicle body;

a holding part capable of switching between an openable-and-closable state and a holding state, the openable-and-closable state being a state in which movement of the door in an opening direction that opens the door and movement of the door in a closing direction that closes the door are allowed, and the holding state being a state in which movement of the door in the opening direction is prohibited and movement of the door in the closing direction is allowed; and a controller configured to control the holding part, wherein the controller is configured to set the holding part to the holding state in response to the door stopping its movement while the door is open.

2. The vehicle door control system according to claim 1, wherein, in response to the door stopping while moving in the opening direction, the controller is configured to set the holding part to the holding state, and, in response to the door stopping while moving in the closing direction, the controller is configured to not set the holding part to the holding state.

3. The vehicle door control system according to claim 1, further comprising:

a release part operable by a user, wherein, in response to the release part being operated, the controller is configured to set the holding part that is in the holding state to the openable-and-closable state.

4. The vehicle door control system according to claim 3, wherein, in response to the door stopping during movement in the opening direction while the holding part is in the openable-and-closable state by the operation of the release part, the controller is configured to set the holding part to the holding state.

5. The vehicle door control system according to claim 1, wherein, in response to an opening/closing angle of the door being equal to or less than a predetermined angle, the controller is configured to prohibit the holding state.

6. The vehicle door control system according to claim 1, further comprising:

a driver part configured to drive the door to open or close, wherein the controller is configured to control the driver part as the holding part.

7. The vehicle door control system according to claim 6, wherein, in response to the door receiving a load that is equal to or greater than a predetermined value in the opening direction while the driver part of the door is in the holding state, the controller is configured to release the holding state of the driver part.

* * * * *